(12) United States Patent
Jang

(10) Patent No.: US 6,275,357 B1
(45) Date of Patent: *Aug. 14, 2001

(54) LATCHING APPARATUS OF HARD DISK DRIVE USING BIMETAL

(75) Inventor: Deok-hwan Jang, Kyonggi-do (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/220,681

(22) Filed: Dec. 23, 1998

(30) Foreign Application Priority Data

Dec. 23, 1997 (KR) .................................................. 97-72456

(51) Int. Cl.[7] ....................................................... G11B 5/54
(52) U.S. Cl. .......................................................... 360/256.3
(58) Field of Search ................................. 360/256, 256.3, 360/256.5, 256.2, 256.6

(56) References Cited

U.S. PATENT DOCUMENTS 4,996,617 * 2/1991 Yaeger et al. .
5,982,586 * 11/1999 Scura .
6,061,207 * 5/2000 Jang .

FOREIGN PATENT DOCUMENTS 2-172076 * 7/1990 (JP) .
2-267786 * 11/1990 (JP) .

OTHER PUBLICATIONS

IBM Technical Disclosure Bulletin, vol. No. 28, Issue No. 7, pp. 2889–2890. Dec. 1985.*

* cited by examiner

Primary Examiner—Craig A. Renner
(74) Attorney, Agent, or Firm—Sughrue, Mion, Zinn, Macpeak & Seas, PLLC

(57) ABSTRACT

A latching apparatus of a hard disk drive using a bimetal which includes a locking/releasing device for selectively locking/releasing an actuator for protecting a magnetic disk from being damaged by a magnetic head. A bimetal member operates the locking/releasing by heat expanding and shrinking according to whether an electric power is being applied. A heating device operates bimetal member. Preferably, the heating device is made of tantalum-aluminum(TaAl) alloy or nickel-chrome(NiCr) alloy.

36 Claims, 9 Drawing Sheets

LATCHING APPARATUS OF HARD DISK DRIVE USING BIMETAL

BACKGROUND OF THE INVENTION

1. Field of the Invention

The present invention relates to a hard disk drive(HDD), and more particularly relates to a latching apparatus of an HDD using a bimetal in which a magnetic disk is prevented from being damaged by external vibration or impact by firmly fixing an actuator in a state where the magnetic head is being parked, using expansion and shrinkage of bimetal.

2. Description of the Related Art

Generally, computers equip an auxiliary memory as a subsidiary means of a main memory for recording much data which exceeds memory capacity of the main memory. A magnetic disk, a magnetic tape, a magnetic drum, a floppy disk and an optical disk are known as auxiliary memories. A hard disk drive having at least one magnetic disk is widely used as an auxiliary memory in a personal computer.

A conventional embodiment of the magnetic disk drive will be described hereinafter with reference to the attached drawings.

As shown in FIGS. 1 and 2, at least one magnetic disk 2 is rotatably fixed by a spindle motor(not shown) in a main body 1. Both sides of the magnetic disk 2 can memorize or read information.

An actuator is installed on one edge portion in the main body 1. The actuator includes: an arm 4 which is rotatably supported by a pivot bearing 3; a suspension 5 which is combined with and fixed to an end portion of the arm 4 in parallel with the magnetic disk 2; a pair of magnetic heads 6 which is supported by the end portion of the suspension 5 for facing each other; and a voice coil motor 7 which consists of a coil and a magnet and is installed on the arm 3.

When a pair of magnetic heads 6 access each side of the magnetic disk 2, the pivot bearing 3 is a rotational center of rotational movement of the actuator and the rotational power is generated by the voice coil motor 7.

A slider which is raising by the rotational power of the magnetic disk 2 and magnetic circuits which can memorize or read information in the magnetic disk 2 are formed as a single body in the magnetic head 6.

Moreover, when main power of the hard disk drive is turned off, as set by a system, an actuator locking apparatus automatically moves the magnetic head 6 into a parking zone in the magnetic disk 2 and prevents shaking of the actuator by external vibration or impact. For example, an automatic locking magnet 8 is attached to one edge portion of the main body 1, an automatic locking arm 9 is fixed to an end portion of the arm 4 and a latch pin 10 is fixed to the automatic locking arm 9.

As above-mentioned, in the hard disk drive generally used, when the power is turned off, the magnetic disk 2 keeps at a stop state because the spindle motor is not driven. Accordingly, the magnetic head 6 loses rising power and is in the parking zone in the magnetic disk 2 by the inputted signal in the system.

Then, the latch pin 10 of the actuator is fixed to the automatic locking magnet 8 by the strong magnetic force, the shaking of the actuator by the external vibration or impact is prevented. Consequently, the magnetic head 6 cannot intrude into a data zone of the magnetic disk 2.

In the meantime, when the power of the hard disk drive is turned on, the spindle motor rotates and the magnetic disk 2 connected to the spindle motor rotates. Consequently, the magnetic head 6 rises to a predetermined height according to the rotational pneumatic pressure of the magnetic disk 2. The raised magnetic head 6 moves from inside to outside the magnetic disk 2 and memorizes or reads data by the driving of the actuator according to a system signal.

Then, when the driving power of the voice coil motor 7 exceeds the magnetic force of the automatic locking magnet 8 which restricts the latch pin 10 in the turning off the hard disk drive, the locking state is released. Accordingly, the data is memorized or read by current strength flown in the voice coil motor 7 by moving the magnetic head 6 to a desired position.

But, in the generally used hard disk drive as above-mentioned, the magnetic force of the automatic locking magnet 8 is determined within the range which is not affected by precise position control in case that the magnetic head 6 seeks and follows a predetermined track in the magnetic disk 2. Accordingly, the magnetic force is determined by the driving power and control of the voice coil motor 7.

Consequently, locking force of the actuator has a predetermined value because magnetic force of the automatic locking magnet 8 is limited to some extent. Therefore, if an external vibration or impact is higher than the magnet force of the automatic locking magnet 8, the magnet head 6 reaches the data zone of the magnet disk 2, to thereby cause a hard defect to the data zone of the magnetic disk 2. As a result, the data memorized on the magnetic disk 2 is damaged.

SUMMARY OF THE INVENTION

Therefore, it is an object of the present invention to provide a latching apparatus of a hard disk drive using a bimetal for locking an actuator firmly in a parking state of the magnetic head by using heat expansion and shrinkage of the bimetal according to whether an electric power is applied or not.

It is another object of the present invention to provide a latching apparatus of a hard disk drive using a bimetal for preventing data damage of a magnet disk by firmly fixing the actuator regardless of external vibration or impact.

To accomplish the above objects of the present invention, according to an embodiment of the present invention, there is provided a latching apparatus of a hard disk drive using a bimetal including: locking/releasing means for selectively locking/releasing the actuator for protecting the magnetic disk from being damaged by the magnetic head; a bimetal member for operating the locking/releasing means by heat expanding and shrinking according to whether an electric power is applied or not; and heating means for operating the bimetal member.

According to another embodiment of the present invention, there is provided a latching apparatus of a hard disk drive using a bimetal including: locking/releasing means for selectively locking/releasing the actuator for protecting the magnetic disk from being damaged by the magnetic head; a bimetal member for operating the locking/releasing means by heat expanding and shrinking according to whether an electric power is applied or not; a housing for receiving the bimetal member; an operating member which is supported by the housing to be exposed outwardly and operates said locking/releasing means being interlocked with heat expanding and shrinking operation of the bimetal member; and the heating means for operating the bimetal member by being formed as a single body with the bimetal member.

According to still another embodiment of the present invention, there is provided a latching apparatus of a hard disk drive using a bimetal which includes: locking/releasing means for selectively locking/releasing the actuator for protecting the magnetic disk from being damaged by the magnetic head; a bimetal member for operating the locking/releasing means by heat expanding and shrinking according to whether an electric power is applied or not; a housing for receiving the bimetal member; an operating member which is supported by the housing to be exposed outwardly and operates the locking/releasing means being interlocked with heat expanding and shrinking operation of the bimetal member; a base member of which a periphery is fixed to inside of the housing; and the heating means for operating the bimetal member by being formed on the base member.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 4A and 4B are views of a structure of a latching apparatus using a bimetal according to another embodiment of the present invention, in which FIG. 4A shows the latching apparatus of which an actuator is in a locking state and FIG. 4B shows the latching apparatus of which the actuator is in a releasing state;

FIGS. 13 to 16 are views respectively showing a base member used in the actuator according to the present invention, in which FIGS. 13 and 14 show the base member having a single heater and in which FIGS. 15 and 16 show the base member having a cell type of a heater.

DETAILED DESCRIPTION OF THE PREFERRED EMBODIMENTS

The objects, characteristics and advantages of the above-described invention will be more clearly understood through the preferred embodiments referring to the attached drawings.

Figure 1:
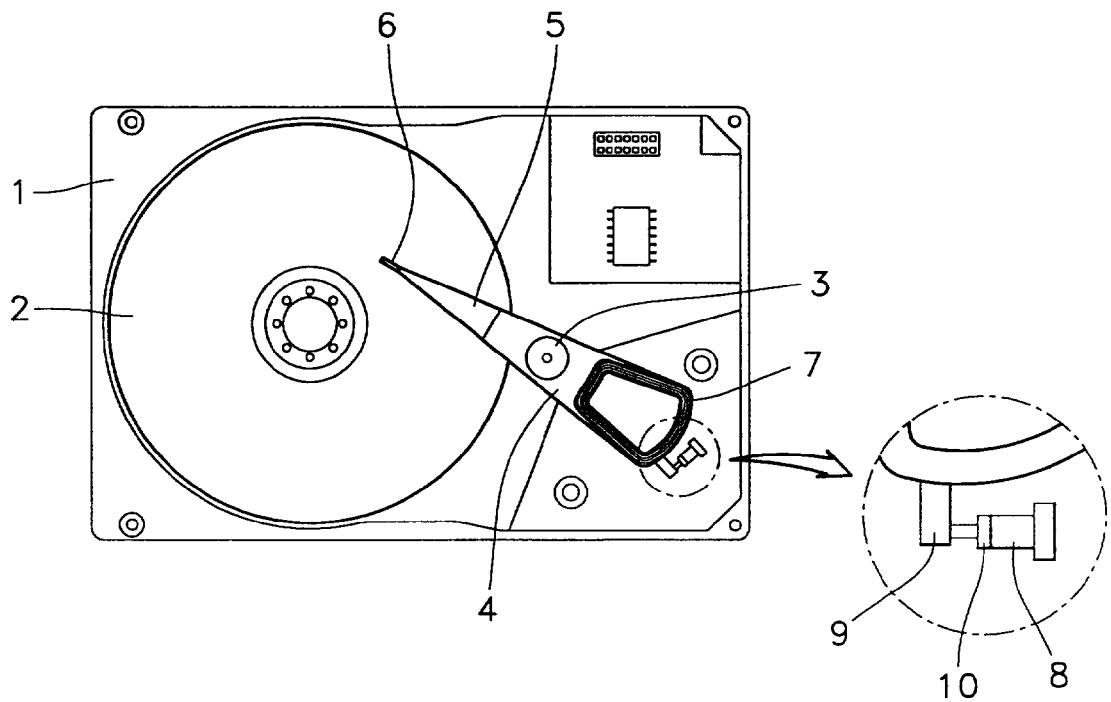
FIG. 1 is a plan view of a hard disk drive including a latching apparatus according to the conventional art.
Figure 2:
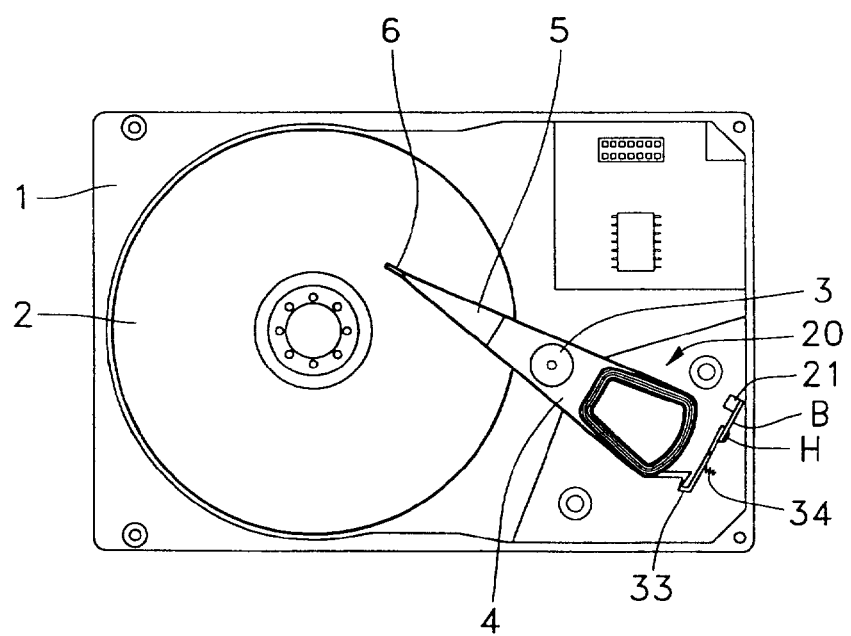
FIG. 2 is a plan view of a hard disk drive including a latching apparatus using a bimetal according to the present invention.
Figure 3:
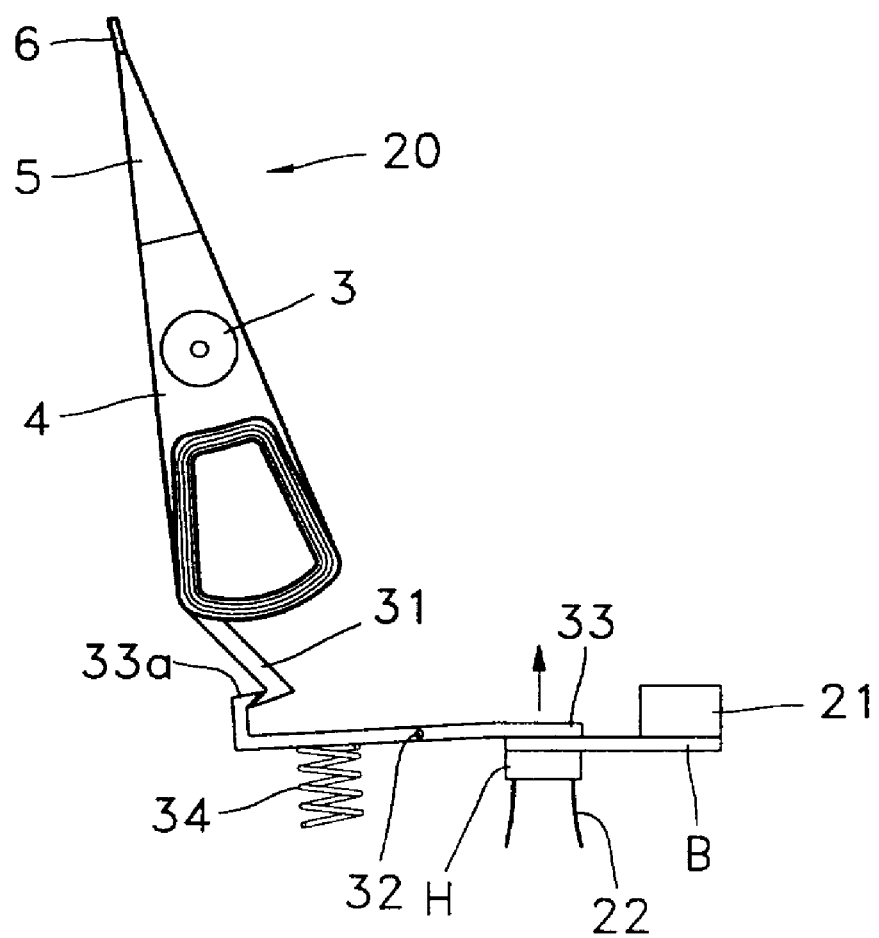
FIG. 3 is a plan view showing a structure of the latching apparatus using a bimetal according to an preferred embodiment of the present invention.

FIG. 2 is a plan view of a hard disk drive equipped with a latching apparatus using a bimetal and FIG. 3 is a plan view showing structure of the latching apparatus using a bimetal according to a preferred embodiment of the present invention.

Figure 4A:
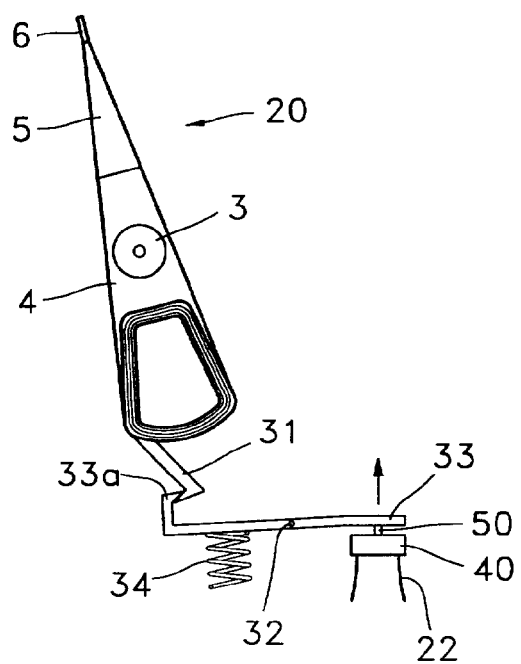
Figure 4B:
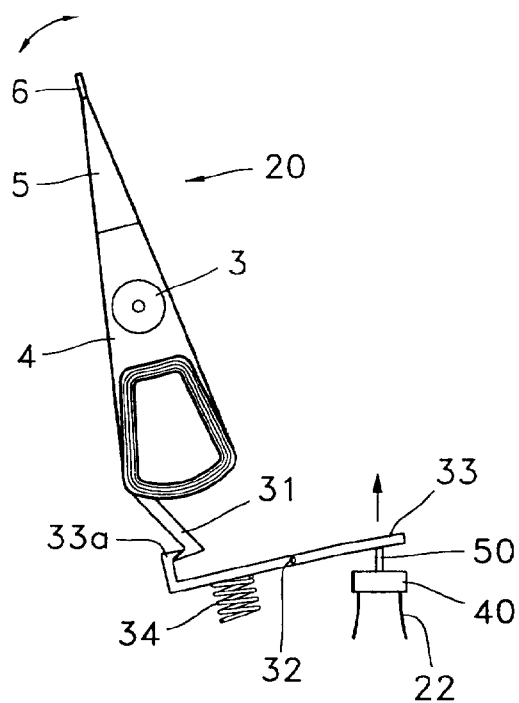

As shown in FIGS. 4A and 4B, the latching apparatus of a hard disk drive using a bimetal according to the present invention includes: locking/releasing means or mechanism for selectively locking/releasing the actuator 20 for protecting a magnetic disk 2 from being damaged by a magnetic head 6; a bimetal member B for operating the locking/releasing means by heat expanding and shrinking according to applied power; and a heater H for operating the bimetal member B.

The heater H of the latching apparatus of a hard disk drive using a bimetal according to the present invention is made of tantalum-aluminum(TaAl) alloy or nickel-chromium (NiCr) alloy.

The locking/releasing means of the present invention includes: a moving latch 31 formed on one end portion of an arm 4 which forms the actuator 20; a rotational latch 33 which is rotatably combined with one side of the actuator 20 by a hinge pin 32 and forms a hooking protrusion 33a for hooking by the moving latch 31; and an elastic member 34 such as a compression coil spring for elastically supporting the rotational latch 33 constantly to one direction.

The locking/releasing means is not restricted to the preferred embodiments shown in the attached drawings and can be modified to various shapes.

The bimetal member B is supported by a supporting arm 21 fixed to a main body 1 and drives the rotational latch 33 by expanding or shrinking by the heater H.

Reference numeral 22 in drawings is a power supply line.

In the following description, when a feature of the present invention is the same as of the prior art, the same numeral will be used.

According to the latching apparatus of a hard disk drive using a bimetal of the present invention, the magnetic head 6 of the actuator 20 is in a parking zone in case the hard disk drive is turned off. That is, the hooking protrusion 33a of the rotational latch 33 is hooked by the moving latch 31 of the arm 4. Accordingly, the actuator 20 does not move anymore regardless of external vibration or impact.

When the power of the hard disk drive is turned on, the power is applied to the heater H via the power supply line 22. When the temperature of the heater H reaches a predetermined temperature, the bimetal member B is rising to bimetal force direction, as shown by using arrow. Accordingly, the rotational latch 33 has a elasticity larger than that of the elastic member 34 and rotates in a counter-clockwise direction centering with the hinge pin 32. Consequently, the locking state is released because the hooking protrusion 33a of the rotational latch 33 is deviated from the moving latch 31 of the actuator 20 and the data on the magnetic disk 12 is read or memorized by system command.

In the mean time, when the power of the hard disk drive is turned off, the magnetic head 6 is in the parking zone of the magnetic disk 2 by a signal inputted into the system. Then, the bimetal member B is shrunken to an initial shape because the power is not applied to the heater H anymore and simultaneously, the rotational latch 33 is rotated a clockwise direction by the elastic force of the elastic member 34. Consequently, the hooking protrusion 33a of the rotational latch 33 is hooked to the moving latch 31 of the arm 4 and the actuator 20 is re-fixed.

Another preferred embodiment which embodies the latching apparatus of a hard disk drive using a bimetal according to the above-mentioned present invention will be described hereinafter.

As shown in FIGS. 4A to 6, the latching apparatus of a hard disk drive using a bimetal according to another preferred embodiment includes: the locking/releasing means for selectively locking/releasing the actuator 20 for protecting the magnetic disk 2 from being damaged by the magnetic head 6; the bimetal member B for operating the locking/releasing means by heat expanding and shrinking according to whether the electric power is applied or not; a housing 40 for receiving the bimetal member B; an operating member 50 which is supported by the housing 40 to be exposed outwardly, interlocked with heat expanding and shrinking operation of the bimetal member B and interlocks with the locking/releasing means; and the heater H for operating the bimetal member B by being formed as a single body with the bimetal member.

That is, the heater H is integrally formed to the bimetal member B in another preferred embodiment of the present invention.

First, the structure of the housing 40 will be described hereinafter. A bimetal holder 41 is formed on an inside wall of the housing 40 for supporting the bimetal member B. And, a guiding hole 42 is formed in an upper portion of the housing 40 for withdrawing the operating member 50.

A lower side end portion of the operating member 50 is contacted to a center portion of the bimetal member B for interlocking with the operation of the bimetal member B.

The operating member 50 is elastically supported to one direction by inserting a elastic member 51 such as a compression coil spring. A protrusion 52 is formed on the lower portion of the operating member 50 for preventing deviation of the elastic member 51.

As shown in FIGS. 7 through 10, the bimetal member B can be formed as a circular, quadrilateral, triangular, bar or any other types. The heater H which is cell-typed TaAl alloy or NiCr alloy is directly formed on the bimetal member B. The plurality of cell-typed heaters H are continuously connected to each other for preventing electric shortage.

As above-mentioned, by forming a plurality of cell-typed heaters H on the bimetal member B having a predetermined shape, heat is simultaneously transmitted to the bimetal member B and the bimetal member B can be operated exactly.

In the following description, when the detailed description related to the preferred embodiment of the present invention is necessary to the substance of another preferred embodiment of the present invention, the detailed description will be emitted.

According to another preferred embodiment of the present invention having the above-mentioned structure, when the hard disk drive is turned off, as shown in FIG. 4a, the magnetic head 6 of the actuator 20 is in the parking zone of the magnetic disk 2(shown in FIG. 2). In this state, the hooking protrusion 33a of the rotational latch 33 is hooked on the moving latch 31 of the arm 4 and the actuator 20 keeps at a stop state regardless of the external vibration or impact.

Figure 5:
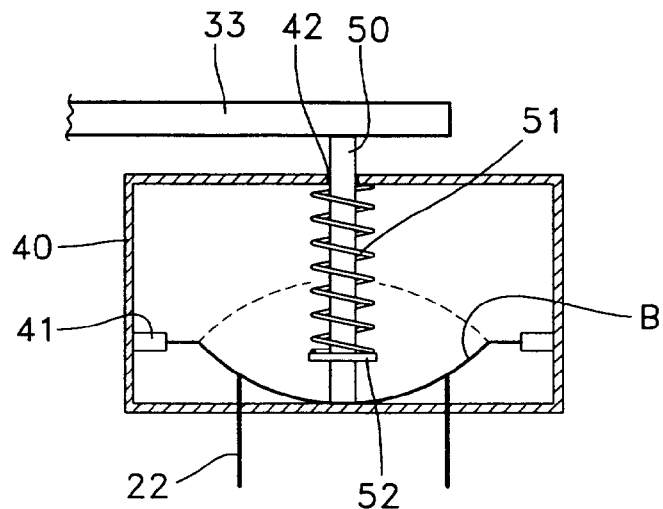
FIG. 5 is a sectional view of an actuator of a latching apparatus according to still another embodiment of the present invention, in which a bimetal member is in a normal state.

Then, as shown in FIG. 5, the bimetal member B keeps its initial state and the moving member 50 is received in the housing 40 by the rotational latch 33 because the power is not supplied by the power supply line 22.

Figure 6:
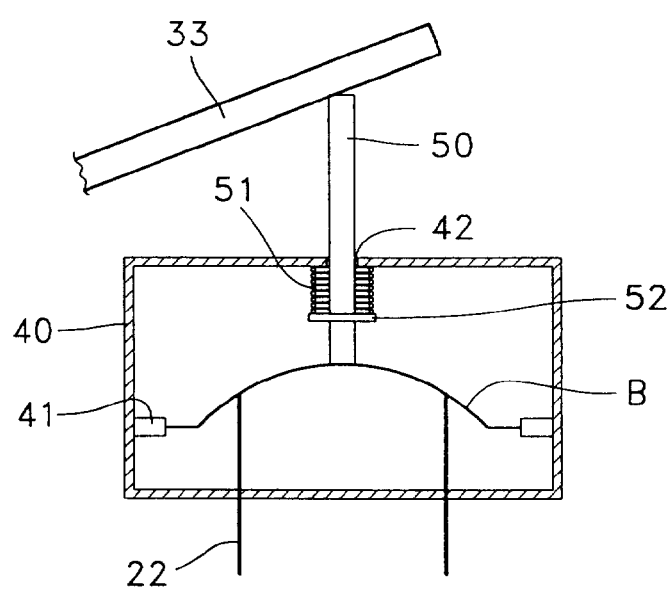
FIG. 6 is a sectional view of the actuator of the latching apparatus in FIG. 5, in which the bimetal member is subjected to an application of an electric power to be expanded.
Figure 7:
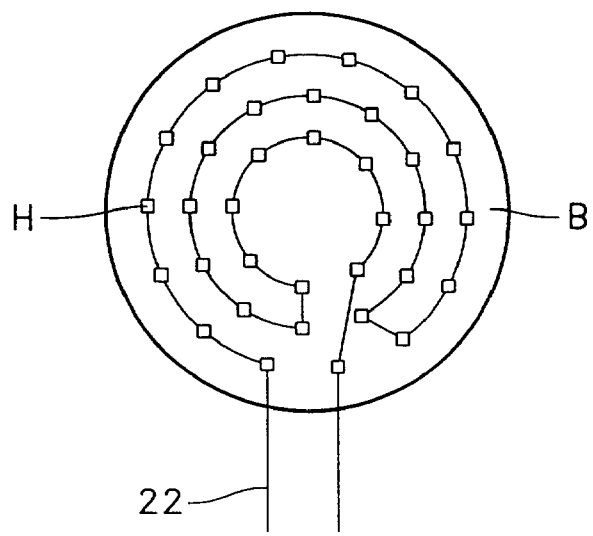
FIGS. 7 to 10 are plan views showing various types of the bimetal applied to the actuator of the latching apparatus in FIG. 5.
Figure 8:
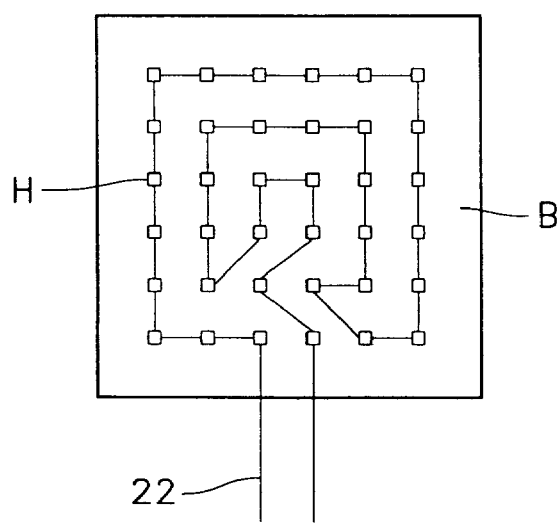
Figure 9:
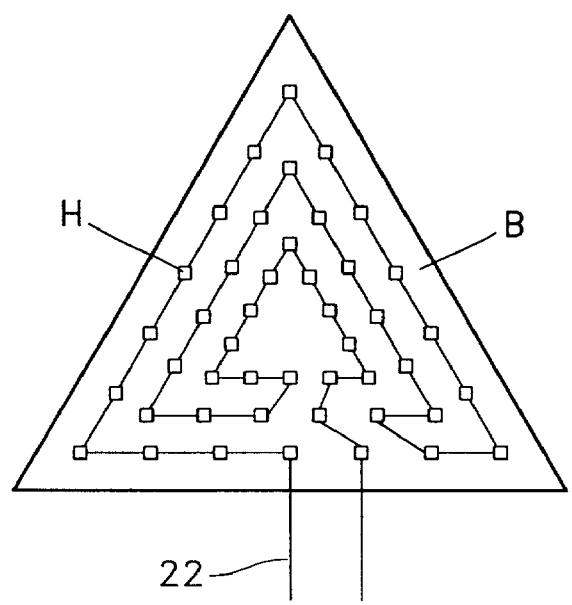
Figure 10:
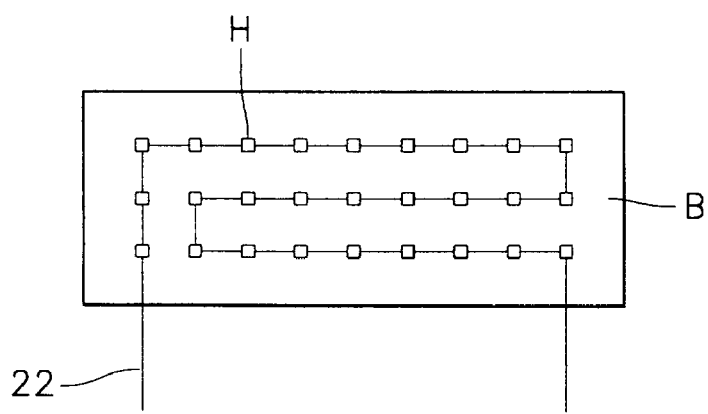

When the hard disk drive is turned on in this state, the power is applied to the cell type heater H via the power supply line 22 and the heat by the heater H is simultaneously and evenly transmitted to the bimetal member B. Then, when the temperature of the heater H reaches a predetermined temperature, as shown in FIG. 6, the bimetal member B is heat-expanded and accordingly, the operating member 50 moves to the bimetal force direction which is indicated by using an arrow and rotates the rotational latch 33 to counterclockwise direction. Accordingly, as shown in FIG. 4B, according to the rotational operation of the rotational latch 33, the hooking protrusion 33a of the rotational latch 33 is deviated from the moving latch 31 of the actuator 20. Consequently, the locking state is released and the data of the magnetic disk 2 can be read or memorized by the system command.

Moreover, when the hard disk drive is turned off, the magnetic head 6 is received in the parking zone of the magnetic disk 2 by the inputted signal in the system. Then, the bimetal member B is restored to the initial state because the power is not supplied to the heater H and simultaneously, the rotational latch 33 rotates to clockwise direction by dynamic stability of the elastic member 34. Accordingly, the hooking protrusion 33a of the rotational latch 33 is hooked to the moving latch 31 of the arm 4. Consequently, the actuator 20 is re-fixed and as shown in FIG. 5, the operating member 50 is restored to the initial state.

Figure 11:
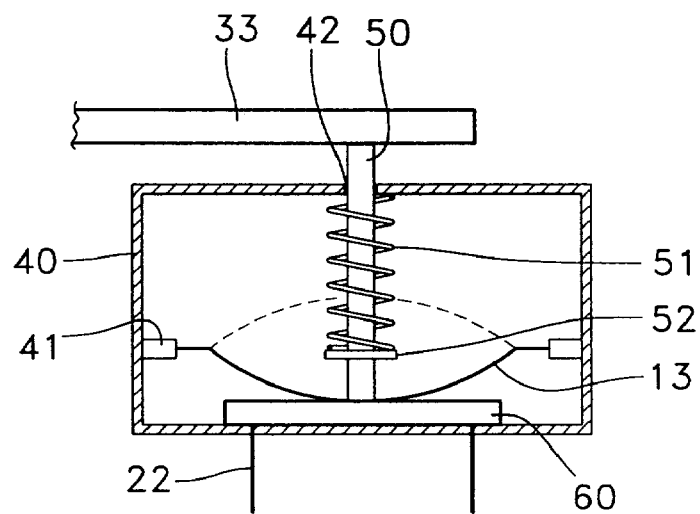
FIG. 11 is a sectional view of an actuator of a latching apparatus according to still further embodiment of the present invention, in which a bimetal member is in a normal state.
Figure 12:
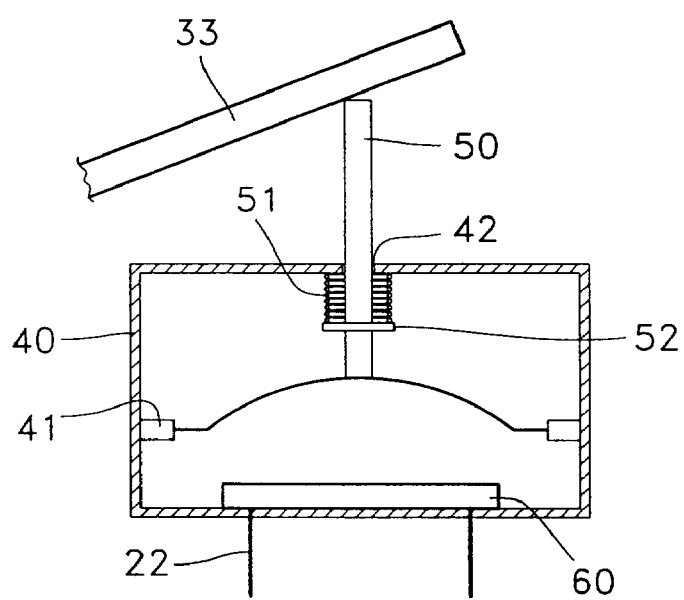
FIG. 12 is a sectional view of the actuator of the latching apparatus in FIG. 11, which shows the bimetal member expanded by an electric power applied thereto.

In the mean time, FIGS. 11 and 12 show still another preferred embodiment of the present invention.

The heater H is formed not directly on the bimetal member 13 but on a separate base metal 60, which is the characteristic of still another preferred embodiment of the present invention.

That is, the latching apparatus of a hard disk drive using a bimetal, according to still another preferred embodiment of the present invention, includes: the locking/releasing means for selectively locking/releasing the actuator 20 for protecting the magnetic disk 2(with reference to FIG. 2) from being damaged by the magnetic head 6(with reference to FIGS. 4A and 4B); the bimetal member 13 for operating the locking/releasing means by heat expanding and shrinking according to the power supply; the housing 40 for receiving the bimetal member 13; the operating member 50 which is supported by the housing 40 to be exposed outwardly, interlocked with heat expanding and shrinking operation of the bimetal member 13 and interlocks with the locking/releasing means; the base metal 60 which is fixed to the inside of the housing 40; and the heater H for operating the bimetal member 13 is formed on the base metal 60.

The heater H is made of tantalum-aluminum(TaAl) alloy or nickel-chromium(NiCr) alloy.

Figure 13:
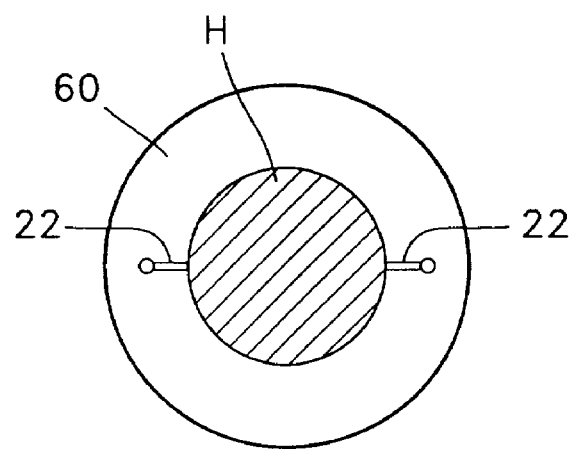
Figure 14:
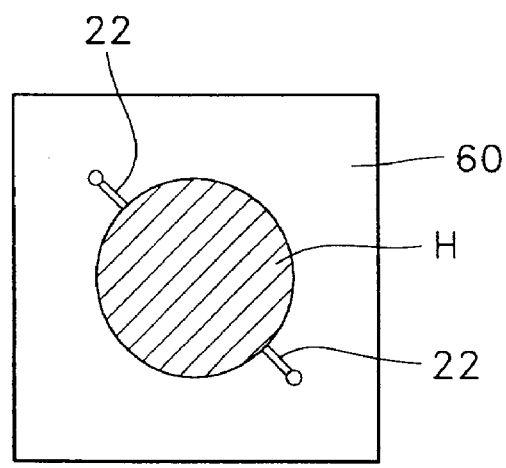
Figure 15:
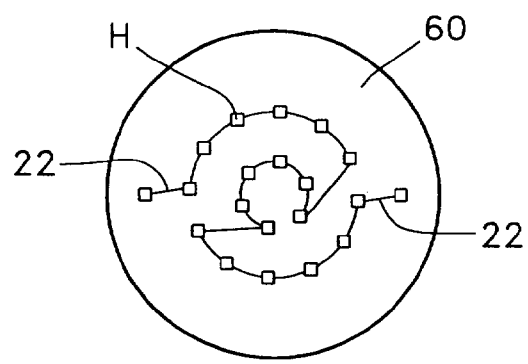
Figure 16:
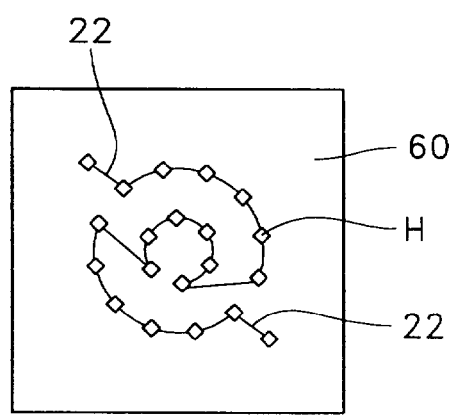

The method for forming the heater H on the base metal 60 is shown in FIGS. 13 through 16. As shown in FIGS. 13 and 14, the integrally formed heater H having a predetermined size is formed on the base metal 60 and both power supply lines 22 are respectively withdrawn and extended downward in both sides of the base metal 60. Or as shown in FIGS. 15 and 16, the heater H having a plurality of cells is formed on the base metal 60 and each heater H is continuously connected by the power supply line 22.

Preferably, the base metal 60 is made of nonconducting substance 61 such as aluminum oxide($Al_2O_3$), ceramic, glass and so on and the shape of the base metal 60 is a disk or a quadrilateral having a predetermined thickness.

The shape of the base metal 60 is not restricted to the preferred embodiments shown in the attached drawings.

According to still another preferred embodiment of the present invention having the above-mentioned structure, when the hard disk drive is turned off, the hooking protrusion 33a of the rotational latch 33 is hooked on the moving latch 31 of the arm 4 and the actuator 20 keeps at a stop state regardless of the external vibration or impact.

Then, as shown in FIG. 11, because the power is not supplied by the power supply line 22, the bimetal member 13 keeps its initial state and the moving member 50 is received in the housing 40 by the rotational latch 33.

When the hard disk drive is turned on in this state, the power is supplied to the integrally formed heater H on the base metal 60 via the power supply line 22. When the temperature of the heater H reaches a predetermined temperature, as shown in FIG. 12, the locking state of the actuator 20 is released by the heat expansion of the bimetal member 13.

In the mean time, when the hard disk drive is turned off, the bimetal member 13 is restored to the initial state and simultaneously, the rotational latch 33 is restored to the initial state. Consequently, the actuator 20 is re-fixed and the operating member 50 is restored to the initial state.

Figure 17:
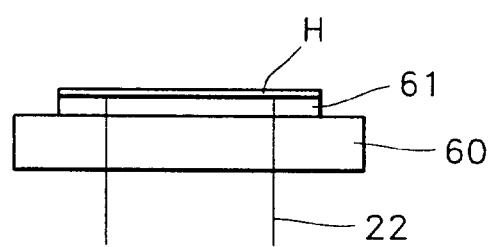
FIG. 17 is a sectional view of a base member made from a metal according to still further embodiment of the present invention.

Metal can be used as a base metal 60 in still another preferred embodiment of the present invention. For example, as shown in FIG. 17, in case that the base metal 60 is made of copper, the actuator 20 can be locked or released by forming the nonconducting substance 61 on the base metal 60 and forming the heater H of TaAl alloy or NiCr alloy on the nonconducting substance 61.

As the terms mentioned in the specification are determined based upon the function of the present invention, and they can be changed according to the technician's intention or a usual practice, the terms should be determined considering the overall contents of the specification of t he present invention.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A latching apparatus of a hard disk drive using a bimetal, comprising:
    a locking/releasing mechanism which selectively locks/releases an actuator for protecting a magnetic disk from being damaged by a magnetic head;
    a bimetal member for operating said locking/releasing mechanism by heat expanding and shrinking according to whether an electric power is applied;
    a housing for receiving said bimetal member;
    an operating member perpendicular to and centrally positioned above said bimetal member, said operating member being supported by said housing so as to be exposed outwardly from said housing and operating said locking/releasing mechanism by being manipulated with a heat expanding and shrinking operation of said bimetal member; and
    a heater which heats said bimetal member.

2. A latching apparatus of a hard disk drive using a bimetal of claim 1, wherein said heater is spread on a front surface of said bimetal member and has a cell shape.

3. A latching apparatus of a hard disk drive using a bimetal of claim 1, wherein said heater is made of tantalum-aluminum(TaAl) alloy.

4. A latching apparatus of a hard disk drive using a bimetal of claim 1, wherein said heater is made of nickel-chormium (NiCr) alloy.

5. A latching apparatus of a hard disk drive using a bimetal of claim 1, wherein a bimetal holder is formed on an inside wall of said housing for fixing said bimetal member and a guiding hole is formed on said housing for guiding said operating member.

6. A latching apparatus of a hard disk drive using a bimetal of claim 1, wherein said operating member is elastically supported by a first elastic member to one direction to said housing, said first elastic member being disposed in said housing.

7. A latching apparatus of a hard disk drive using a bimetal of claim 6, wherein said first elastic member is a compression coil spring which cooperates with said operating member and has one end portion which is supported by a hooking protrusion of said operating member and another end portion which is supported by an inside wall of said housing.

8. A latching apparatus of a hard disk drive using a bimetal of claim 1, wherein said locking/releasing mechanism comprises:
    a moving latch formed on one end portion of an arm of the actuator;
    a rotational latch which is rotatably combined with a main body of the disk drive by a hinge pin and hooks said moving latch; and
    a second elastic member for elastically supporting said rotational latch constantly toward one direction.

9. A latching apparatus of a hard disk drive using a bimetal of claim 8, wherein said second elastic member is a compression coil spring having one end portion connected to said rotational latch and the other end portion fixed to the main body, and said rotational latch moves toward said moving latch.

10. A latching apparatus of a hard disk drive using a bimetal, comprising:
    a locking/releasing mechanism which selectively locks/releases an actuator for protecting a magnetic disk from being damaged by a magnetic head;
    a bimetal member for operating said locking/releasing mechanism by heat expanding and shrinking according to whether an electric power is applied or not;
    a housing for receiving said bimetal member;
    an operating member perpendicular to and centrally positioned above said bimetal member, said operating member being supported by said housing to be exposed outwardly from said housing and operating said locking/releasing mechanism by being manipulated with a heat expanding and shrinking operation of said bimetal member;
    a base member of which a periphery is fixed to an inside of said housing; and
    a heater, which heats said bimetal member, being formed on said base member.

11. A latching apparatus of a hard disk drive using a bimetal of claim 10, wherein said heater has a predetermined size and is integrally formed on said base member.

12. A latching apparatus of a hard disk drive using a bimetal of claim 10, wherein said heater is spread on a whole surface of said base member and has a cell shape.

13. A latching apparatus of a hard disk drive using a bimetal of claim 11 or claim 12, wherein said base member is a nonconducting substance.

14. A latching apparatus of a hard disk drive using a bimetal of claim 13, wherein said nonconducting substance is one of the groups consisting of aluminum oxide($Al_2O_3$), ceramic and glass.

15. A latching apparatus of a hard disk drive using a bimetal of claim 10, wherein said base member is made of a metal, a nonconducting substance is formed on one surface of said base member and said heater is formed on an upper surface of said nonconducting substance.

16. A latching apparatus of a hard disk drive using a bimetal of claim 15, wherein said base member is made of copper.

17. A latching apparatus of a hard disk drive using a bimetal of claim 10, wherein said heater is made of tantalum-aluminum(TaAl) alloy.

18. A latching apparatus of a hard disk drive using a bimetal of claim 10, wherein said heater is made of nickel-chormium(NiCr) alloy.

19. A latching apparatus of a hard disk drive using a bimetal of claim 10, said locking/releasing mechanism comprises:
   a moving latch formed on one end portion of an arm of said actuator;
   a rotational latch which is rotatably combined with a main body of the disk drive by a hinge pin and hooks said moving latch; and
   a second elastic member for elastically supporting said rotational latch constantly toward one direction.

20. A latching apparatus of a hard disk drive using a bimetal of claim 19, wherein said second elastic member is a compression coil spring having one end portion connected to said rotational latch and the other end portion fixed to the main body, and forces said rotational latch toward said moving latch.

21. A latching apparatus of a hard disk drive using a bimetal of claim 10, wherein a bimetal holder is formed on an inside wall of said housing for fixing said bimetal member and a guiding hole is formed in said housing for guiding said operating member.

22. A latching apparatus of a hard disk drive using a bimetal of claim 21, wherein said operating member is elastically supported by a first elastic member toward one direction of said housing, said first elastic number being disposed in said housing.

23. A latching apparatus of a hard disk drive using a bimetal of claim 22, wherein said first elastic member is a compression coil spring which cooperates with said operating member and has one end portion supported by a hooking protrusion of said operating member and another end portion supported by the inside wall of said housing.

24. A latching apparatus of a hard disk drive using a bimetal, comprising:
   a locking/releasing mechanism which selectively locks/releases an actuator for protecting a magnetic disk from being damaged by a magnetic head;
   a bimetal member operating said locking/releasing mechanism by heat expanding and shrinking according to whether an electric power is applied;
   a housing for receiving said bimetal member;
   a bimetal holder formed on an inside wall of said housing and which fixes said bimetal member;
   a base member of which a periphery is fixed to an inside of said housing;
   a heater, which heats said bimetal member, being formed on said base member;
   an operating member which is supported by said housing to be exposed outwardly from said housing and operates said locking/releasing mechanism which is manipulated with a heat expanding and shrinking operation of said bimetal member; and
   said housing having a guiding hole which guides said operating member,
   wherein said operating member is elastically supported by a first elastic member toward one direction of said housing, said first elastic member being disposed in said housing and comprising a compression coil spring which cooperates with said operating member and has one end portion supported by a hooking protrusion of said operating member and another end portion supported by the inside wall of said housing.

25. A latching apparatus as in claim 24, wherein said heater is formed on said base member.

26. A latching apparatus as in claim 25, wherein said heater is made of nickel-chromium alloy.

27. A latching apparatus as in claim 25, wherein said heater is made of tantalum-aluminum alloy.

28. A latching apparatus as in claim 26, wherein said base member is aluminum oxide.

29. A latching apparatus as in claim 26, wherein said base member is ceramic.

30. A latching apparatus as in claim 26, wherein said base member is glass.

31. A latching apparatus as in claim 27, wherein said base member is aluminum oxide.

32. A latching apparatus as in claim 27, wherein said base member is ceramic.

33. A latching apparatus as in claim 27, wherein said base member is glass.

34. A latching apparatus as in claim 24, wherein a nonconducting substance is formed on said base member;
   said base member is copper; and
   said heater is formed on said nonconducting substance.

35. A latching apparatus as in claim 34, wherein said heater is tantalum-aluminum alloy.

36. A latching apparatus as in claim 34, wherein said heater is nickel-chromium alloy.

* * * * *